United States Patent Office 3,311,579
Patented Mar. 28, 1967

3,311,579
WATER SOLUBLE AND INSOLUBLE EMULSIFIER MIXTURE FOR VINYL POLYMERS
Frank J. Donat, Cleveland, Ohio, assignor to The B. F. Goodrich Company, New York, N.Y., a corporation of New York
No Drawing. Filed Feb. 6, 1963, Ser. No. 256,537
10 Claims. (Cl. 260—23)

This invention relates to emulsion type vinyl polymers and more particularly pertains to thermally stable, easily processed, spherical, uniform particle size polyvinyl resins and to an improved process for preparing the same in aqueous emulsion systems. Briefly stated, the process comprises initiating the formation and growth of the polymer particles with an insoluble soap as the sole emulsifier and then introducing into the polymerization medium, within a particular range of vinyl monomer conversion, a conventional soluble emulsifier to act as an emulsion stabilizer.

This application is a continuation-in-part of my copending application Ser. No. 202,955, filed June 18, 1962.

The present invention embodies an improved process over those disclosed in copending U.S. patent applications of Frank J. Donat, Ser. No. 118,770, filed June 22, 1961, now U.S. Patent 3,167,533; Frank J. Donat and Edwin H. Baker, Ser. No. 162,223, filed Dec. 26, 1961, now U.S. Patent 3,249,594; Ser. No. 188,884, filed Apr. 19, 1962, now U.S. Patent 3,196,134; Ser. No. 180,312, filed Mar. 16, 1962, now U.S. Patent 3,189,582; and Ser. No. 202,968, filed June 18, 1962, now abandoned.

In the aforementioned copending patent applications, it has been shown that certain types of vinyl polymers can be prepared in the form of spherical, uniform particles of controlled size by the use of an "insoluble soap" as the sole emulsifier in an aqueous medium. The process embodied herein produces vinyl resin emulsions of significantly higher solids content which also are much more stable to shear than those of the parent processes. It was disclosed in the aforesaid patent applications that the polymer which is formed in emulsion in the presence of an insoluble soap can be isolated from its emulsion simply by a high mechanical shear treatment. This is a decided advantage in the production of electrical grade resins substantially free of electrolytes. It is disadvantageous in many instances, however, to work with emulsions which are acutely sensitive to shear. The uniform particle size emulsions resulting from the present novel process are more stable to shear and have long shelf lives.

It is known in the art to prepare reasonably uniform particle size resins by various complex procedures. One procedure, set out in detail in U.S. Patent No. 2,520,959, calls for the use of a "seed" latex which must be prepared in a certain manner wherein numerous calculations must be made before the final polymerization is carried out. Other methods include the use of a mixture of water-soluble and monomer-soluble emulsifiers and the use of a special, highly critical technique of proportioning small amounts of conventional emulsifier into the polymerization mixture during the course of the polymerization reaction. These methods are set forth in British Patents 627,265; 698,359 and 699,016, respectively. With even the latter technique, the final product often contains a heterogeneous mixture of various sized particles.

It is also known that certain metal soaps of saturated, unsaturated and substituted fatty acids are excellent stabilizers for polyvinyl chloride as disclosed in U.S. Patent No. 2,075,543 and in British Plastics, vol. 27, pp. 176–9 (1954). The metal soap stabilizers are generally incorporated into the resin after the polymerization step has been completed, that is, the stabilizers are added to the water-free molten resin or to a solution of the resin in a common solvent. Moreover, it has been suggested that certain stabilizers be incorporated along with conventional emulsifiers into the polymerization recipe or in the isolation step in polyvinyl chloride synthesis, as set forth in U.S. Patents 2,364,227, 2,365,506 and 2,508,-801; British Patents 599,429 and 652,069 and Canadian Patent 453,165. The additives are used to improve the heat, light, or electrical stability of the resins, or to increase catalyst activity or accelerate the reaction rate during polymerization.

The use of materials commonly referred to as "insoluble soaps," "heavy metal soaps," "insoluble metal soaps," "polyvalent metal soaps," "driers" and "metallic soaps" as the sole emulsifiers for the emulsion polymerization of vinyl monomers or mixtures of vinyl monomers with other polymerizable, monoolefinically unsaturated monomers is a new technique in vinyl polymer resin preparation. The prior art does not teach or suggest that such soaps would have utility, per se, in the polymerization reaction. There is no indication in the prior art that such materials would have any value as emulsifiers in an aqueous system especially in view of their known limited solubility in water. The "insoluble soaps" embodied herein are not generally regarded as emulsifiers for water systems. This invention, which is discussed in more detail below, is indeed unobvious and unexpected in view of the state of the art.

It is an object of the present invention to provide a simple method for preparing high solids, stable emulsions of spherical uniform particle size vinyl polymer resins. The term "stable" means an emulsion's ability to withstand latex coagulation due to the effects of heat, moderate shearing forces, and long storage periods. Moreover, the resins retain the ability to withstand degradation due to the effects of heat and light without added stabilizers because of the beneficial effect of the insoluble soap residues which are incorporated therein. Another object is the provision of high solids, stable emulsions of polyvinyl chloride resins which are easily and rapidly processed in conventional plastics sheeting, molding and extrusion equipment. That the foregoing and other objects are accomplished by the present invention will become apparent to one skilled in the art from a careful reading of the following description and illustrative examples.

The present process embodies the initiation of the polymerization of one or more vinyl monomers in an aqueous medium in the presence of a water-insoluble soap as the sole emulsifier and the subsequent addition at some finite conversion of a water-soluble emulsifier, while the polymerization is still progressing, to produce a stable, uniform particle size polymer emulsion. An important advantage of the process is the ability to produce stable, easily processable emulsions of relatively high polymer content, e.g., from about 20 to about 45% solids by weight.

The emulsion polymerization process embodied herein is to be distinguished from the suspension polymerization process known in the vinyl resins art. The distinction between the "emulsion" and "suspension" processes is made in "Vinyl and Related Polymers" by C. A. Schildknecht, John Wiley & Sons, Inc., N.Y., 1952, pp. 393–398.

The vinyl monomers embodied herein are those having a single polymerizable $CH_2=C<$ grouping, such as vinyl chloride, vinylidene chloride, vinyl acetate, methyl methacrylate, ethyl methacrylate, ethyl acrylate, n-butyl acrylate, t-butyl acrylate, styrene and the like and their equivalents. Preferred as vinyl monomers in the present process are members selected from the group consisting of vinyl chloride, vinylidene chloride, vinyl acetate, methyl methacrylate and styrene and mixtures thereof. The useful copolymers of the foregoing specific monomers embodied in the present invention are those resulting from the copolymerization of at least 70% by weight of at least one of the foregoing specific monomers and from 0 to 30% of at least one other monomer copolymerizable therewith.

Most preferred as the vinyl polymers embodied in the novel process of this invention are the homopolymers, copolymers and interpolymers of from 70 to 100% by weight of at least one member selected from the group consisting of vinyl chloride, vinylidene chloride, vinyl acetate, methyl methacrylate and styrene and from 0 to 30% by weight of at least one ether monomer copolymerizable therewith.

Among the other monomers useful in minor proportions in copolymerization with the essential specific monomers embodied herein and set forth above are monoolefinically unsaturated monomers, particularly those having a $CH_2=C<$ grouping or a $—CH=CH—$ grouping. Representative monoolefinically unsaturated monomers include the other vinyl halides such as vinyl bromide, vinyl fluoride, vinylidene bromide, vinylidene fluoride, chlorotrifluoro ethylene, 1,2-dichloroethylene, and the like; other vinyl esters such as vinyl propionate, vinyl butyrate, vinyl benzoate, vinyl laurate, isopropenyl caproate, and the like; the acrylate and other methacrylate esters such as methyl acrylate, ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate, and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diheptyl fumarates, the dioctyl fumarates, the didecyl fumarates, dicyclohexyl fumarate, diphenyl fumarate and the like; the other vinyl aromatic monomers such as alpha methyl sytrene, the vinyl toluenes, the vinyl xylenes, vinyl naphthalene, and the like; the monoolefins such as ethylene, propylene, the butylenes, the amylenes, the hexylenes, cyclohexene, and the like; the vinyl ethers such as vinyl methyl ether, vinyl ethyl ether, the vinyl propyl ethers, the vinyl butyl ethers, the vinyl amyl ethers, the vinyl hexyl ethers, the vinyl octyl ethers, vinyl cyclohexyl ether, vinyl phenyl ether, vinyl benzyl ether and the like; the allyl esters and ethers such as allyl acetate, allyl laurate, allyl benzoate, allyl methyl ether, allyl ethyl ether, and the like; vinyl cyanides such as acrylonitrile, methacrylonitrile, vinylidene cyanide and the like; alpha, beta-olefinically unsaturated carboxylic acids and anhydrides thereof such as acrylic acid, methacrylic acid, maleic acid, itaconic acid, citraconic acid, aconitic acid, and the like; alpha, beta-olefinically unsaturated acid amides such as acrylamide, methacrylamide, N-methyl acrylamide, N,N-diethyl acrylamide, N,N-dipropyl methacrylamide, N-phenyl acrylamide, N-methylol acrylamide, N-methylol methacrylamide, N-vinyl pyrrolidone, and the like; the vinyl amines such as the vinyl pyridines, and the like and others.

Particularly preferred are the interpolymers of from 70 to 100% by weight of vinyl chloride and from 0 to 30% by weight of one or more monomers selected from the group consisting of

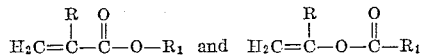

wherein R is a member of the group consisting of hydrogen and an alkyl group having from 1 to 4 carbon atoms, and $R_1$ is a hydrocarbon group having from 1 to 12 carbon atoms. Even more preferred are the monomers in which $R_1$ in the above formulas is an alkyl group having from 1 to 8 carbon atoms.

The metallic soaps or "insoluble" soaps useful as the initial sole emulsifiers in the process of the present invention include the lithium and polyvalent metal salts of saturated, unsaturated, and substituted fatty acids. The polyvalent metal moieties of these soaps include in general the metals of Groups II, III and IV of the Mendeleef Periodic Table, and more particularly include beryllium, barium, calcium, magesium, strontium, cadmium, zinc, lead, tin, titanium, and aluminum. The fatty acid moieties preferred in the insoluble soaps embodied herein are octanoic, stearic, oleic, linoleic, ricinoleic, palmitic, abietic, and the like. Most preferred are the monobasic saturated acids having from 8 to 22 carbon atoms. Also included in the present invention are the aforementioned polyvalent metal salts of organic sulfates such as barium lauryl sulfate and other insoluble hydrocarbon sulfates containing from 8 to 22 carbon atoms. Mixtures of the foregoing insoluble soaps and sulfates may also be used in the process described herein.

Most preferred in this invention are the insoluble soaps having the formula $(X—COO)_nM$ wherein X is an alkyl group having from 7 to 21 carbon atoms and M is a member selected from the group consisting of lithium, barium, calcuim, magnesium, cadmium, zinc, lead, tin, and aluminum and $n$ is a whole number equal to the valence of M. The insoluble soaps may be charged per se to the reaction mixture prior to initiation of the polymerization or they may be prepared in the prepolymerized mixture by reacting one of the aforesaid fatty acids with a soluble salt or base of an appropriate metal moiety, such as the hydroxide, sulfate, phosphates, etc. thereof. The insoluble soap emulsifiers embodied herein are most useful in the range of from about 0.075 to 3 parts by weight, preferably from 0.1 to 1.0 part, per 100 parts by weight of monomer.

It is possible, by varying the chain length of the organic portion of the "insoluble soap" emulsifier employed in the process, to vary the ultimate particle size of a given vinyl polymer resin product. In general, the longer chain fatty acid insoluble soap emulsifiers give larger particle size resins than do the shorter fatty acid insoluble soap emulsifiers. With fatty acids having less than 12 carbon atoms, however, the particle size again increases. It has been found that one can blend uniform lots of large and small particle polyvinyl chloride resins embodied herein and make pourable vinyl plastisols having desirable rheological properties by a method similar to that disclosed in U.S. Patent No. 2,553,916. The latices as well as the dried resins may be blended for these plastisol formulations.

The vinyl polymer latices or fine particle dispersions produced by the process of this invention generally contain polymer existing substantially as a single family of uniformed size, spherical particles having average diameters within the range of from about 0.05 to about 10 microns, desirably from 0.1 to 3 microns, and most preferably from about 0.2 to 1 micron in diameter.

The conventional "soluble soaps" or soluble emulsifiers useful herein include the well-known cationic, anionic and nonionic types of emulsifiers and surface active agents.

The soluble emulsifiers are sometimes subdivided into wetting agents, stabilizers, detergents, suspending agents, etc. An emulsifier is used in an emulsion formulation to increase the ease of formation of the emulsion and to promote the stability of the emulsion. These actions are usually accomplished by reduction of interfacial tension between the two phases and by protective colloid behavior respectively.

Emulsifiers may be divided according to their behavior into ionic and nonionic. The ionic type of emulsifier is composed of an organic lyophilic group and a hydrophilic group. The ionic types may be further divided into anionic and cationic, depending upon the nature of the ion-active group. The lyophilic portion of the molecule is usually considered to be the surface-active portion. Thus in soap, the surface active fatty acid portion of the molecule represents the anion in the molecule, and, therefore, soaps are classified as anionic emulsifiers. As would be expected, anionic and cationic surface-active agents are not mutually compatible. Owing to opposing ionic charges they tend to neutralize each other, and their surface-active effect is nullified.

Nonionic emulsifiers are completely covalent and show no apparent tendency to ionize. They may, therefore, be combined with other nonionic surface-active agents and with either anionic or cationic agents as well. The nonionic emulsifiers are likewise more immune to the action of electrolytes than the anionic surface-active agents.

Representative cationic emulsifying agents include the long chain quaternary salts such as cetyltriethylammonium chloride, the alkyl dimethylbenzylammonium chlorides, and the like. Anionic emulsifiers include sodium stearate, potassium laurate, morpholine oleate, sodium lauryl sulfate, sodium 2-ethyl hexyl sulfate, sodium xylene sulfonate, sodium naphthalene-sulfonate, sodium alkyl naphthalene-sulfonate, sodium sulfosuccinate, sodium oleic acid sulfonate, sodium castor oil sulfonate, glycerol monostearate containing a sodium fatty alcohol sulfate, glycerol monostearate containing a soap, and the like. Nonionic emulsifiers include the polyoxyethylene fatty alcohol ethers, polyglycol fatty acid esters, polyoxyethylene modified fatty acid esters, polyoxyethylenepolyol fatty acid esters, polyoxypropylene fatty alcohols ethers, polypropylene glycol fatty acid esters, polyoxypropylene modified fatty acid esters, polyoxypropylenepolyol fatty acid esters, polyol fatty acid monoesters, polyhydric alcohol fatty acid di, tri-, etc. esters, cholesterol and fatty acid esters, oxidized fatty oils, and the like. Other emulsifiers, surface-active agents and surfactants embodied herein may be found in "Encyclopedia of Chemical Technology" by Kirk and Othmer, Interscience Encyclopedia, Inc., N.Y., 1950, vol. 13, pages 513–536; "Soap and Chemical Specialties," December 1957, pages 59–68, January 1958, pages 45–62, February 1958, pages 53–70, March 1958, pages 59–74 and April 1958, pages 55–67; the textbook, "Emulsions: Theory and Practice," by Paul Becher, Reinhold Publishing Corp., N.Y., 1957, particularly pages 237–367.

The preferred soluble soaps, however, are the ammonium, sodium, or potassium salts of mono-carboxylic fatty acids having from 8 to 22 carbon atoms, such as ammonium stearate, ammonium laurate, sodium laurate, potassium laurate, potassium myristate, and the like.

In the process of this invention the polymerization of one or more vinyl monomers is initiated, advantageously utilizing a polymerization initiator or catalyst, in an aqueous medium in the presence of an insoluble soap which is the only emulsifier contained therein. As the polymerization proceeds to some finite conversion (preferably to at least about 1% and more preferably to at least about 3% conversion of monomers to polymer based on the total monomers present), a conventional soluble emulsifier is added to the polymerization mixture in such a quantity that it serves only to stabilize the polymer particles present in the polymerization mixture and not in such quantity that some free emulsifier will be present to initiate the growth of new polymer particles. The addition of the soluble emulsifier should begin before about 50% of monomer conversion.

The present invention is a novel process for initiating a controlled number of uniform sized particles of polymer and maintaining the same particles in a stabilized condition so that they continue to grow in a uniform manner during the course of the polymerization. The resulting uniform particle size emulsion is decidedly more stable to high shear as well as to settling or creaming on aging than those resulting from the process of the aforementioned copending patent applications. Once the polymerization has been initiated and carried to some finite degree of conversion in the presence of the insoluble soap as the sole emulsifier, the method of this invention comprises maintaining a critical relationship between the amount of dispersing agent present in the latex and the available surface area of the polymer particles which are in the process of growing. After some finite degree of conversion, a sufficient quantity of a conventional emulsifier is added to protect the polymer particles against coalescence or coagulation, but no excess of conventional emulsifier can be present because such an excess will cause the initiation of new polymer particles which will result in a final polymeric product having non-uniform particle size. More details concerning the theory of polymer particle initiation and growth and the effects of excess dispersing agent are set out in U.S. Patent No. 2,520,959.

The addition of the conventional emulsifier may be done in one or more batch type or incremental additions or it may be done continuously, provided it is not started before about 1% conversion of monomers to polymer has occurred in the presence of an insoluble soap as the sole emulsifier and further provided that an excess of conventional emulsifier over that required to stabilize the polymer particles already present in the latex is not added.

The soluble emulsifier added during polymeriaztion in accordance with this invention is generally useful in a total amount of up to about 1.5 parts by weight per 100 parts by weight of monomer initially charged; however, the maximum allowable amount depends to a large extent on the particular polymerization system and reaction conditions employed. Usually, from about 0.05 to about 0.7 part by weight, and preferably from 0.1 to 0.5 part, per 100 parts by weight of monomer initially present, is adequate.

When the aforementioned, preferred ammonium, sodium and potassium salts of fatty acids are utilized as the soluble emulsifier, the most desirable method for injecting said soluble emulsifier into the reaction mixture is to form the emulsifying agent in situ, as for example, by adding to the mixture a soluble salt or base of the cation moiety of the emulsifier, such as the hydroxide, sulfate, phosphates, carbonate, nitrate, and the like. The additive reacts therein with free fatty acid already present and thus forms the emulsifier. Or in the alternative, excess insoluble soap present in the reaction mixture can be converted to soluble emulsifier by reacting the aforesaid salt or base with the excess insoluble soap. In the preferred embodiments the salt or base of the cation moiety is fed in the form of a dilute solution thereof in water. Generally, the base or salt of the hereinbefore specified cation is reacted with the specified fatty acid in essentially stoichiometric quantities to generate the soluble emulsifier in situ, however, a reasonable excess of either is not detrimental. These procedures eliminate the problems inherent in handling and feeding the soluble emulsifiers, many of which form gels and viscous liquids in concentrated aqueous solution at convenient feed temperatures, e.g., around 70° to 100° F. Thus, the soluble soap or conventional emulsifier may be introduced into the polymerization mixture in any of several ways. For instance, in employing sodium laurate as the soluble soap (1) sodium laurate itself can be added to the polymerization system (2) excess barium laurate can be used as the initial insoluble soap and during polymerization some of the excess can be converted to sodium laurate by the controlled addition of sodium sulfate to the polymerization system, or (3) the initial polymerization mixture may contain lauric acid which can be converted to sodium laurte by metering sodium hydroxide into the system.

The process of this invention is carried out conveniently in conventional polymerization equipment with agitation of the ingredients in the presence of a free-radical initiator at a tempearture of from about 0° to 100° C. The pH of the polymerization mixture does not appear to be critical and it can be varied from about 2 to about 10. A pH of from about 7 to 10 is preferred. The polymerization can be carried out under atmospheric, sub-atmospheric or super-atmospheric pressure. The polymerization is best carried out at a reaction temperature in the range of from about 30° to 60° C. In general, the polymerization temperature chosen does not influence the particle size or processability of the product, but as those skilled in the art know, lower temperatures tend to produce higher molecular weight products and higher temperatures tend to produce lower molecular weight polymers. It is also known that lower molecular weight resins soften at somewhat lower temperatures than the higher molecular weight analogues. The slow reaction rates at the extreme lower temperatures tend to make operations below about 20° C. very unattractive.

To obtain the best polymerization characteristics, for instance, good reaction rate and no substantial decrease in catalyst activity during the polymerization period, the reaction is desirably carried out in the substantial absence of oxygen, in other words, "in a substantially oxygen-free medium." This term is applied to a polymerization in which all traces of oxygen may not have been excluded, but in which ordinary precautions are used to reduce the amount of oxygen to a minimum, e.g., below about 100 p.p.m. Exemplary of "ordinary precautions" are the following operations preparatory to polymerization of vinyl chloride: the water medium is charged to the reactor at 70° C., the reactor is sealed, and the contents cooled to 30° C. causing a slight vacuum which is then broken with nitrogen. The reactor is then more rigorously evacuated (26 inches of Hg), purged with vinyl chloride monomer to a pressure of 10 to 30 p.s.i.g., evacuated again, and then charged with the vinyl chloride monomer to be polymerized. The catalyst may be added either before or after the monomer charge.

In the novel polymerization process embodied herein the best results are obtained and the most stable latex results when mild but thorough agitation is employed. Stated differently, the most stable latices result from the process embodied herein when good mixing with low shear is employed during the course of the polymerization. Low to moderate shear mixing will not cause coagulation of the resin, but high shear mixing will cause coagulation. The use of high shear mixing is actually a convenient way to coagulate the resin if it is desired to do so either during or after completion of the polymerization reaction.

The free radical initiators useful in the process of the present invention include chemicals which decompose to produce free radicals under the foregoing reaction conditions, as well as various forms of actinic radiation such as ultraviolet light, X-rays and the various types of nuclear radiation. Preferred as free radical initiators in the present invention are the commonly used polymerization initiators including the peroxides, hydroperoxides, azo compounds and redox catalysts. Most preferred are the water-soluble initiators such as potassium persulfate, ammonium persulfate, sodium persulfate, hydrogen peroxide, potassium perphosphate, and the like, as well as the well known water-soluble redox catalysts. Also included within the scope of the present invention are the alkyl borane-peroxide catalysts described in U.S. Patent No. 3,025,284 and the copending U.S. patent applications of Paul J. George et al., Ser. Nos. 733,255 and 733,265 both filed May 6, 1958, both now abandoned. The free radical initiator is most useful in the range of from about 0.005 part to 1.0 part by weight per one hundred parts of monomer and more preferably from 0.01 to 0.3 part per hundred parts of monomer.

As previously stated, the soluble soap or conventional emulsifier is introduced into or formed in situ in the reaction mixture subsequent to the initiation of polymerization and after a finite conversion of monomer to polymer. More specifically, the additional of the soluble emulsifier is begun after at least about 1% and before about 50% of monomer conversion. The addition may be continued during the course of the polymerization reaction and is desirably completed before the conversion exceeds about 90%. In the more preferred embodiments, soluble emulsifier addition is effected from at least 3%, most perferably from 5 to 40%. It is most desirable to complete the soluble emulsifier addition before about 85% of monomer conversion.

It is convenient and advantageous to meter the soluble emulsifier, or the reactant(s) to form same, in an essentially continuous flow into the reaction mixture at a substantially constant or uniform rate during the above-described addition period. The emulsifier can also be added in increments or slugs of reasonable size, but in either case, it is added in such a quantity that serves only to stabilize polymer particles present in the reaction mixture and is insufficient to initiate the formation of new polymer particles by promoting or covering the nucleation thereof. The novel process described herein thus allows the original family of polymer particles to grow larger as reaction proceeds, thereby ultimately producing a latex of uniformly sized spherical articles. The size thereof is influenced to a large extent by the choice of the insoluble soap or insoluble soap mixture as discussed previously.

It is worthy of reemphasis that care must be taken not to add an incremental amount of soluble emulsifier sufficient to cause new particles nucleation. These amounts can easily be determined. Periodically during the course of the polymerization reaction and within the specified limits of conversion, a small sample is withdrawn from the reaction mixture, weighed, carefully degassed, and adjusted to room temperature. The surface tension of the sample is then measured as, for example, by means of a Cenco Du Nuöy Interfacial Tensiometer. Small increments of the conventional soluble emulsifier in aqueous solution are added to the sample, stirring thoroughly after each addition; the surface tension of the sample is measured after each addition. A plot of surface tension vs. the cumulative amount of soluble emulsifier is drawn. The plot shows a straight line curve, then a sharp break and leveling off at the point when an excess of soluble emulsifier was present in the sample. The amount of emulsifier corresponding to the break in the straight line curve is used to calculate the limiting amount that can be safely added to the polymerization reaction without causing new particle formation. This amount may be readily calculated as follows:

$$\frac{\text{Weight of contents of reactor}}{\text{Original weight of sample titrated}} \times$$
Amount of emulsifier determined by titration (at curve break)=Amount of emulsifier that may be added to reactor The "weight of the contents of reactor" is simply the original weight of all materials charged less the combined weight of all samples that have been removed from the reactor (which may be insignificant in a large sized reaction).

Another method for calculating the amount of standard emulsified to be added to the reactor is as follows:

$$\frac{\text{Weight of latex only in reactor}}{\text{Weight of degassed sample}} \times$$
Volume of standard emulsifier (found by titration)

wherein the "weight of latex only in reactor" is determined from total solids measurement, or less accurately, by pressure drop data, or other known methods for determining conversion.

Instead of measuring surface tension in the above-described determinations, the conductance (reciprocal of resistance) of the latex sample can be measured and plotted in a similar manner. The conductometric titration curve will show the sharp break corresponding to that in the surface tension titration curve. The two methods, which may be employed interchangeably, are described in detail, with respect to the mechanics involved, by E. A. Willson, J. R. Miller, and E. H. Rowe, in the Journal of Physical and Colloid Chemistry, vol. 53, No. 3, March 1949.

It is apparent that the process steps of this invention may also be carried out in a routine fashion after enough experimental data of the foregoing type have been obtained for a given recipe simply by (1) initiating the polymerization of vinyl monomer in an aqueous medium in the presence of an insoluble soap as the sole emulsifier and allowing the polymerization to proceed to some finite degree of conversion, (2) determining degree of conversion by such means as measuring total solids content of the polymerization mixture, measuring pressured drop of the system, monitoring the changes in density of the polymerization mixture, measuring the monomer usage by determining the changes in the composition of the vapor phase in the reactor, etc. and then adding conventional emulsifier in an amount previously calculated to be the required amount for a given degree of conversion.

The preferred amounts of soluble emulsifier (residing within the range of 0.05 to 0.7 part and more preferred from 0.1 to 0.5 part per 100 parts by weight of monomer initially charged), when fed continuously to the polymerization reaction at substantially a constant rate during the course of the reaction within the prescribed conversions, are insufficient to promote the nucleation of new particles, provided that the rate of conversion of monomer to polymer is reasonably normal for vinyl latex polymerization in these systems, i.e., the rate is not abnormally affected due to catalyst poisoning, an inadvertent temperature drop or rise, monomer contamination, etc. In the rare cases of abnormal conversion rate, either too high or too low, the rate of injection of soluble emulsifier is adjusted according to the results of the titration performed on control samples by either the surface tension method or conductance method discussed above. The feed rate of soluble emulsifier is then decreased when monomer conversion rate is significantly below the norm and of course increased when conversion rate exceeds the norm. If convenient, the conductance or surface tension of the latex inside the reactor can be monitored and recorded at all times during addition of soluble emulsifier by installing appropriate sensing elements in the vessel and translating their signals via well known control instrumentation.

In the polymerizations embodied herein, the final monomer conversion generally is above about 40%. For practical considerations and reasons of economy, a vinyl resin polymerization is usually taken to an ultimate conversion of at least greater than 70%, however, as a general rule, the reaction should not be permitted to proceed to beyond 95% conversion. It is recognized that resins produced at lower conversions are more heat stable, in most cases, than their counterparts obtained from high conversion polymerizations. As is known to those skilled in the art, vinyl chloride polymerizations normally require from about 10 to about 30 hours to attain the aforesaid conversions, depending to a large degree on the reaction temperature, the amount of catalyst present and its activity.

A distinct advantage of the present process is that it is adaptable to the production of stable, relatively high solids content emulsions. In fact, it is preferred to produce emulsions containing greater than 20% solids by weight and especially containing from about 35 to 45% solids. It has been found that the polyvinyl chloride resins embodied herein can be prepared in stable form from recipes employing as much as 50% of monomer based on the total weight of water and monomer. When the general upper limit of 95% conversion is obtained, these emulsions contain about 48% solids. But it has been observed that with mixtures containing above about 45% solids, the emulsions tend to become less stable and have higher coagulum levels.

As stated earlier, the latices of this invention are comparatively stable to coagulation from heat and shear, but nevertheless it has been found that the latex tends to coagulate if subjected to high mechanical shearing forces. Therefore, it is sometimes expedient to add additional small amounts of a conventional soluble emulsifier to the emulsion to insure retention of its good shear-stable properties during subsequent handling steps such as transfer through small lines or valves, pumping, spray drying operations, and other similar mechanical, high-shear processing. This additional water-soluble emulsifier is added to the emulsion at any time after termination of the polymerization reaction and prior to subsequent handling. It may be desirable to introduce this post-polymerization stabilizer just prior to venting unreacted monomer from the reactor. Generally from about 0.05 to 2 parts, preferably from 0.1 to 0.7 part, of extra soluble emulsifier per 100 parts of polymer are sufficient to retain the shear stability of the latex during handling.

The vinyl resins resulting from the process of this invention may be isolated from their latices by conventional methods of coagulation with such agents as sodium chloride, calcium chloride, calcium acetate, cadmium chloride, sodium carbonate, alcohols, hydrochloric acid, sulfuric acid, and the like by procedures well known in the art. The resin latices embodied herein can also be heat coagulated, freeze coagulated or spray dried. The coagulated product is conveniently isolated by filtration, centrifugation, or decantation and may be washed and dried in conventional washing and drying equipment.

The polyvinyl chloride resins produced according to the present invention are distinguished from their counterparts prepared in other emulsion systems in that they are much more easily processed in milling, calendering and extrusion equipment. The polyvinyl chloride resins embodied herein can be melt-extruded at 180° C. with a constant force (about 1,000 to 1,500 pounds on a ¼ inch ram) through a fine orifice having a 0.0625 inch diameter at an extremely high rate to give an extruded filament having a very smooth surface and exhibiting very low swell (i.e., the diameter of the extrudate is less than 0.070 inch).

The product resins may have incorporated therein small amounts of the lubricants, stabilizers, pigments and fillers well known in the art of thermoplastics.

In the following examples which will serve to illustrate and clarify the process of this invention, the amounts of ingredients are expressed in parts by weight unless otherwise indicated. The specific examples present data which should not be so interpreted as to restrict or limit the invention unnecessarily as modifications of the process will be apparent to those skilled in the art.

*Example I*

A 2-quart capacity, stainless steel-lined reactor equipped with a baffle stirrer having a 3-inch anchor and a pressure gauge was charged with the following ingredients:

|  | Parts | Actual Weight in Grams |
|---|---|---|
| Vinyl chloride | 100 | 400 |
| Distilled Water | 200 | 800 |
| $K_2S_2O_8$ | 0.05 | 0.20 |
| Calcium octanoate | 0.11 | 0.44 |
| Lithium stearate | 0.22 | 0.88 |

Before adding the vinyl chloride monomer the reactor was swept free of air with a nitrogen purge. The polymerization reaction was carried out at about 50° C. with 300 to 350 r.p.m. agitation of the stirrer. At some finite conversion (in other words, at some time after the polymerization commenced) a 20 gram sample of the reaction mixture was removed by means of a veterinary syringe (pressure type) and the optimum amount of standard emulsifier needed for addition to the polymerization reaction mixture for stabilization without the initiation of any new particles was determined by the above-described titration-surface tension measurement technique. This calculated amount of soluble emulsifier solution was added to the polymerization system.

The results of several polymerizations carried out in the foregoing manner are summarized in Table 1.

polymerization was carried to 60% conversion in about 17 hours. The latex particles were uniform and 2,500 A. in diameter at 3% conversion, uniform and 4,500 A. in diameter at 7.8% conversion, uniform and 5,300 A. in diameter at 27% conversion and uniform and 6,900 A. in diameter at 60% conversion. The final latex was stable.

In a repeat of the above experiment wherein titrations and proper soap injections were made at 4% and 11.3%

TABLE 1

| Conventional Emulsifier Injected (grams) | Percent Conv. at Time of Injection | Particle Size of Polymer at Time of Injection | Latex Surface Tension Before Addition of Emulsifier, dynes/cm. | Latex Surface Tension After Addition of Emulsifier, dynes/cm. | Percent Final Conversion | Final Particle Size and Appearance |
|---|---|---|---|---|---|---|
| Potassium Laurate (0.3) | 11.4 | 3,500 A., uniform | 62.5 | | 18.1 | 3,600 A., uniform. |
| Potassium Laurate (4.0) | 12.6 | 2,200 A., uniform | 65.5 | 49.4 | 63 | Do. |
| Potassium Laurate (3.09) (2.5% excess). | 10.9 | 2,900 A., uniform | 77 | 44.5 | 56.5 | 4,800 A., uniform. |
| Potassium Laurate (4.38) (5% excess). | 19.0 | ----do---- | 74.7 | 36.3 | 63 | 4,400 A., only a slight number of new particles nucleated. |
| Sodium Laurate Sulfate (1.32) | 22.0 | 3,000 A., uniform | 74.7 | 42.3 | 69 | 4,500 A., uniform. |
| Sodium Lauryl Sulfate (2.4) (4% excess). | 25.0 | 3,150 A., uniform | 77 | 40.5 | 81 | 5,500 A., fairly uniform, small number of new particles initiated. |
| Non-ionic emulsifier prepared by adding 11 ethylene oxides onto p-nonyl phenol (2.4). | 22 | 2,300 A., uniform | 71.5 | 46.8 | 39 | 2,700 A., uniform. |
| Non-ionic emulsifier prepared by adding 11 ethylene oxides onto p-nonyl phenol (2.19). | 30 | 3,200 A., uniform | 76.7 | 49.7 | 44 | 3,500 A., uniform. |

The particle size and shape was determined by taking a small sample of the latex, diluting it with distilled water, depositing a small amount of the diluted latex on a copper grid, carefully drying and taking an electron photomicrograph of the deposited particles using a Phillips Model E.M. 100B electron microscope.

*Example II*

The procedure described in Example I was followed employing the following polymerization recipe:

Vinyl chloride _____ 100
Distilled water _____ 200
Potassium persulfate _____ 0.05
Calcium octanoate _____ 0.11

The standard emulsifier used in this example was a 2% aqueous solution of potassium laurate. The polymerization was allowed to proceed to 2.24% conversion, a sample of the latex was removed and titration run as described in Example I. 0.46 part of potassium laurate per 100 parts of vinyl chloride was added to the polymerization mixture and the polymerization was allowed to proceed. At 8% conversion another titration was carried out and 0.82 part of potassium laurate was added. The polymerization was carried to 70% conversion and there resulted a stable latex. The particle size of the latex sample at the time of the first injection was 2,500 A. in diameter and uniform, at the time of the second injection the particles were uniform and 4,500 A. in diameter and the final particle size at 70% conversion was 6,900 A. and uniform. The total polymerization time was 12 hours.

*Example III*

The procedure described in Example II was followed employing the following recipe:

Vinyl chloride _____ 100
Distilled water _____ 100
Potassium persulfate _____ 0.05
Calcium octanoate _____ 0.055

The standard emulsifier for titration and injection was a 4% aqueous solution of potassium laurate. Injections of the amount of potassium laurate required to stabilize the particles present in the latex based upon titration data were made at 3%, 7.8% and 27% conversions. The conversion and wherein the polymerization was carried to over 90% conversion in 24 hours it was observed that the latex particles were uniform and 3,700 A. in diameter at 4% conversion, uniform and 5,600 A. in diameter at 11.3% conversion and uniform and 10,000 A. in diameter at about 90% conversion.

*Example IV*

The procedure of Example I was followed employing the following polymerization recipe:

t-Butyl acrylate _____ 100
Distilled water _____ 300
Potassium persulfate _____ 0.1
Calcium palmitate _____ 1.0

A 2% aqueous potassium laurate solution was used as standard emulsifier in the titration and injection. A single injection of 1.19 parts of potassium laurate per 100 parts of t-butyl acrylate was made at 18.2% conversion. The polymerization reaction was allowed to proceed to 90% conversion. The latex particles were found to be uniform and 1,900 A. in diameter at 18.2% conversion and uniform and 4,100 A. in diameter at 90% conversion. The final latex was stable.

Results similar to those shown in these examples were obtained in the homopolymerization of styrene, the copolymerization of vinyl chloride and vinyl acetate, the homopolymerization of vinylidene chloride and in the homopolymerization of methyl methacrylate.

Thus, I have illustrated that one embodiment of the present process involves the sequential steps of (1) conducting the polymerization of one or more vinyl monomers, vinyl chloride for instance, in an aqueous medium in the substantial absence of oxygen at a temperature of from about 0° C. to 100° C. in the presence of an insoluble soap as the sole emulsifier until the conversion of monomer to polymer has reached a value of from about 1 to 50% by weight and then (2) removing an aliquot sample from the polymerization mixture, carefully degassing the sample, cooling the sample to room temperature and titrating the sample latex with a standard solution of a conventional emulsifier, plotting surface tension vs. conventional emulsifier concentration and (3) adding conventional emulsifier to the polymerization mixture to form a concentration equal to that calculated at the break point in the aforementioned plot of surface tension vs. conventional emulsifier concentration and allowing the polymerization to proceed to the desired conversion. The foregoing steps (2) and (3) can be repeated more than once during the polymerization. The titration of step (2) is most accurately conducted at the polymerization temperature.

The following examples are illustrative of that embodiment of the process in which the soluble emulsifier is added to the polymerization system by a continuous metering technique. The runs were carried out in pilot plant reactors. Again, the amounts of ingredients are in parts by weight:

Example V

An emulsion polymerization was carried out starting with the following recipe:

(1) Vinyl chloride _____ 100
(2) Water, demineralized _____ 150
(3) Potassium persulfate _____ 0.04
(4) Lauric acid _____ 0.55
(5) Calcium hydroxide _____ 0.05

From the reaction of (4) and (5) are formed:

Calcium laurate (insoluble soap) _____ 0.30
Free lauric acid _____ 0.28

Polymerization conditions for the entire run were a temperature of about 50° C. and a pressure of about 100 p.s.i.g. The above mixture was reacted for five hours at which time conversion of vinyl chloride monomer to polymer was about 5%. During the next ten hours of reaction 0.345 part of sodium orthophosphate (Na$_3$PO$_4$·12H$_2$O) was continuously metered in at essentially a constant rate as a 4.75% aqueous solution, thus forming in situ by reaction with the free lauric acid 0.03 part per hour of a standard soluble emulsifier, sodium laurate, and a total for the addition period of 0.3 part of sodium laurate. At this stage of reaction the monomer conversion was about 80%. The polymerization was allowed to continue for one more hour at which time a decrease in pressure indicated substantial completion of the reaction. Its termination was completely effected by venting unreacted monomer. Final conversion was 91.2%. The latex, 36.4% solids by weight, was very stable and composed of uniformly sized particles 5,600 A. in diameter. 0.3 part of a soluble emulsifier, ammonium laurate, was added to maintain its shear stability during pumping and spray drying.

Example VI

The starting recipe, reaction conditions, and procedure were substantially the same as in Example V except that the catalyst (initiator) was 0.01 part of unstabilized 30% hydrogen peroxide solution. 0.002 part of the sodium-iron salt of ethylene diamine tetracetic acid was also added. After six hours of reaction and a conversion of 5%, soluble soap formation was begun and continued at a constant rate for 8.5 hours. The soluble soap was sodium laurate formed in situ as in Example V using a 4% solution of sodium orthophosphate. The total amount formed was 0.3 part or 0.035 part per hour. At the end of the soluble emulsifier forming period, conversion of monomer to polymer was 67%. Reaction was continued for 0.50 hour and then terminated. Final conversion was 84%. The emulsion contained 34.4% solids which had a uniform particle size of 5,800 A. The emulsion was a stable latex. 0.3 part of ammonium laurate was again added to retain shear stability through subsequent, severe, physical processing steps.

Example VII

The initial charge for the polymerization was:

Vinyl chloride _____ 100
Water, demineralized _____ 200
Potassium persulfate _____ 0.04
Lithium stearate (insoluble soap) _____ 0.25

Reaction conditions were 46° C. and about 90 p.s.i.g. After nine hours and 25% conversion, 0.1 part sodium laurate (as a 1.2% aqueous solution) was continuously and uniformly metered into the mixture over a six hour period. At the end of this period, conversion was 40%. The reaction was allowed to proceed for an additional 13 hours to a conversion of 91.5%. Solids content of the emulsion was 30.5%. The particle size of the latex was relatively small but quite uniform, residing within the range of 1,700 to 2,000 A. The stable latex was rendered even more stable by the addition of 0.5 part of a conventional emulsifier, the sodium salt of a sulfonated alkyl aryl polyether.

Example VIII

In this run the initial charge comprised:

(1) Vinyl chloride _____ 100
(2) Water, demineralized _____ 200
(3) Potassium persulfate _____ 0.03
(4) Lithium stearate _____ 0.226
(5) Octanoic acid _____ 0.097
(6) Calcium hydroxide _____ 0.025

From the reaction of (5) and (6) are formed:

Calcium octanoate _____ 0.113

This run was made with an insoluble soap mixture consisting of lithium stearate and calcium octanoate. The polymerization was carried out at 46° C. and about 90 p.s.i.g. After 8 hours and about 40% conversion, 0.2 part of sodium laurate emulsifier was metered into the mixture over a six hour period; the conversion then was 72%. Four more hours of reaction permitted the conversion to reach 78%. The latex particles were essentially all about 10,000 A. in diameter. There was an insignificant number of small particles, 1,000 to 2,000 A. in diameter. The emulsion was 26% solids and was stable. Adding 0.5 part of additional conventional emulsifier ensured its stability to high-shear in future processing.

Example IX

In this run the reactor charge was:

(1) Vinyl chloride _____ 100
(2) Water, demineralized _____ 200
(3) Potassium persulfate _____ 0.04
(4) Lauric acid _____ 0.55
(5) Octanoic acid _____ 0.027
(6) Calcium hydroxide _____ 0.057

From the reaction of (4) and (6) are formed:

Calcium laurate (insoluble soap) _____ 0.30
Free lauric acid _____ 0.28

From the reaction of (5) and (6) are formed:

Calcium octanoate (insoluble soap) _____ 0.03

This polymerization was initiated in the presence of an insoluble soap mixture consisting of calcium octanoate and calcium laurate. The reaction was conducted at 46 to 50° C. and 90 to 100 p.s.i.g. After twelve hours and about 10% conversion of monomer to polymer, soluble emulsifier injection was begun and continued for the next six hours. The soluble soap was sodium laurate, fed at the rate of 0.043 part per hour (total of 0.26 part), which was formed in situ in the emulsion mixture by reacting the free lauric acid with a total of 0.30 part of sodium orthophosphate continuously metered thereto as a 3.5% aqueous solution. The conversion at the end of this soluble soap addition period was about 40%. The reaction was allowed to continue for six more hours resulting in a conversion of 91%. Solids content of the latex was 30.4%. The polymer particles were spherical and substantially uniform, 7,000 to 7,700 A. in diameter. The inherent stability of the latex was apparent when handled in further processing steps.

Example X

In this run the initial charge to the polymerization reactor was:

| | |
|---|---|
| (1) Vinyl chloride | 100 |
| (2) Water, demineralized | 300 |
| (3) Potassium persulfate | 0.05 |
| (4) Lauric acid | 0.30 |
| (5) Barium hydroxide [Ba(OH)$_2$·8H$_2$O] | 0.128 |

From the reaction of (4) and (5) are formed:

Barium laurate (insoluble soap) _____ 0.217

Reaction conditions were 50° C. and 99 p.s.i.g. There was no emulsifier injection into the mixture during the polymerization. The latex began coagulating at the end of the 15th hour of reaction and was completely coagulated after 17.5 hours when the reaction was terminated. This example illustrates that emulsions prepared without the soluble emulsifier addition during the polymerization, as disclosed herein, are comparatively unstable, even at relatively low solids content, as compared to emulsions prepared according to the present invention.

I claim:

1. The process comprising initiating a polymerization of at least one vinyl monomer in an aqueous medium in admixture with a water-insoluble soap as the sole emulsifier and subsequently adding at 1 to 50% conversion a water-soluble emulsifier in an amount sufficient to stabilize the existing polymer particles but substantially insufficient to cause the nucleation of any new particles while the polymerization is still progressing to produce a stable, uniform sized particle emulsion.

2. The process of claim 1 comprising initiating a polymerization of at least one vinyl monomer in an aqueous medium in admixture with at least one water-insoluble soap having the structure (X—COO)$_n$M wherein X is an alkyl group having from 7 to 21 carbon atoms, M is a member selected from the group consisting of lithium, barium, calcium, magnesium, cadmium, zinc, lead, tin and aluminum, and $n$ is a whole number equal to the valence of M, and subsequently adding at 1 to 50% conversion a water-soluble emulsifier in an amount sufficient to stabilize the existing polymer particles but substantially insufficient to cause the nucleation of any new polymer particles while the polymerization reaction is progressing to produce a stable, uniform sized particle polymer emulsion.

3. The process of claim 2 wherein the insoluble soap is present in the range of from 0.075 to 3 parts by weight per 100 parts by weight of monomer.

4. The process of claim 3 wherein the vinyl monomer is from 70 to 100% by weight of at least one member selected from the group consisting of vinyl chloride, vinylidene chloride, vinyl acetate, methyl methacrylate, and styrene and from 0 to 30% by weight of at least one other monoolefinically unsaturated monomer copolymerizable therewith.

5. The process of claim 1 for preparing a stable, uniform size particle emulsion of a vinyl polymer which comprises the steps of:
   (a) initiating the emulsion polymerization, in aqueous reaction medium, of from 70 to 100% by weight of at least one monomer selected from the group consisting of vinyl chloride, vinylidene chloride, vinyl acetate, methyl methacrylate, and styrene, and from 0 to 30% by weight of at least one other monoolefinically unsaturated monomer copolymerizable therewith, said aqueous medium containing in admixture at least one water-insoluble soap as the sole emulsifier; and
   (b) adding incrementally to the reaction medium, during the course of the polymerization and after at least about 1% conversion of monomer to polymer, a water-soluble emulsifier in amounts sufficient to stabilize existing polymer particles but essentially insufficient to cause the nucleation of new polymer particles; and
   (c) terminating the polymerization at a conversion of at least greater than about 40%.

6. The process according to claim 5 wherein said incremental addition of the water-soluble emulsifier is essentially continuous and at a substantially constant rate.

7. The process of claim 5 for preparing a stable, uniform size particle emulsion of a polyvinyl chloride resin which comprises the steps of:
   (a) initiating the emulsion polymerization in aqueous reaction medium, at a temperature of from 0° to 100° C., of a monomeric mixture comprising from 70 to 100% by weight of vinyl chloride and from 0 to 30% by weight of at least one other monomer copolymerizable therewith selected from the group consisting of

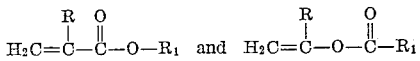

wherein R is a member of the group consisting of hydrogen and an alkyl group having from 1 to 4 carbon atoms, and R$_1$ is a hydrocarbon group having from 1 to 12 carbon atoms, said aqueous medium containing in admixture from about 0.075 to 3 parts by weight, per 100 parts by weight of monomers initially present, of at least one water-insoluble soap as the sole emulsifier, said soap having the structure (X—COO)$_n$M wherein X is an alkyl group containing from 7 to 21 carbon atoms, M is a member of the group consisting of lithium, barium, calcium, magnesium, cadmium, zinc, lead, tin and aluminum, and $n$ is a whole number equal to the valence of M; and
   (b) metering, at a substantially constant rate into said reaction medium during the course of the reaction and after at least about 1% conversion of monomer to polymer, from about 0.05 to about 0.7 part by weight, per 100 parts by weight of monomers initially present, of a water-soluble emulsifier, whereby said water-soluble emulsifier serves to stabilize existing polymer particles but is insufficient to cause the nucleation of new polymer particles; and
   (c) terminating the polymerization reaction at a conversion of at least greater than about 40%.

8. The process of claim 7 wherein the water-soluble emulsifier is a soap selected from the group consisting of the ammonium, sodium and potassium salts of fatty acids having from 8 to 22 carbon atoms.

9. The process of claim 8 wherein the water-insoluble soap is calcium laurate, lithium stearate or barium laurate in an amount from 0.1 to 1 part by weight and the water-soluble emulsifier is sodium laurate or potassium laurate in an amount from 0.1 to 0.5 part by weight per 100 parts by weight of monomers.

10. The process of claim 9 wherein the water-insoluble soap is a mixture containing calcium octanoate.

References Cited by the Examiner
UNITED STATES PATENTS

| | | | |
|---|---|---|---|
| 2,485,616 | 10/1949 | Long et al. | 260—92.8 |
| 2,569,447 | 10/1951 | Borglin et al. | 260—92.8 |
| 3,167,533 | 1/1965 | Donat | 260—86.3 |
| 3,189,582 | 6/1965 | Donat et al. | 260—85.5 |

MURRAY TILLMAN, *Primary Examiner.*

J. ZIEGLER, *Assistant Examiner.*